United States Patent
Kokes et al.

(10) Patent No.: US 8,239,480 B2
(45) Date of Patent: Aug. 7, 2012

(54) METHODS OF SEARCHING USING CAPTURED PORTIONS OF DIGITAL AUDIO CONTENT AND ADDITIONAL INFORMATION SEPARATE THEREFROM AND RELATED SYSTEMS AND COMPUTER PROGRAM PRODUCTS

(75) Inventors: Mark G. Kokes, Raleigh, NC (US); L. Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1300 days.

(21) Appl. No.: 11/931,072

(22) Filed: Oct. 31, 2007

(65) Prior Publication Data
US 2008/0057922 A1    Mar. 6, 2008

Related U.S. Application Data

(63) Continuation-in-part of application No. 11/468,845, filed on Aug. 31, 2006.

(60) Provisional application No. 60/980,470, filed on Oct. 17, 2007.

(51) Int. Cl.
*G06F 15/16* (2006.01)
*G06F 15/167* (2006.01)

(52) U.S. Cl. ......... 709/217; 709/212; 709/218; 709/219

(58) Field of Classification Search .......... 709/217–219, 709/212
See application file for complete search history.

(56) References Cited

U.S. PATENT DOCUMENTS

| | | | |
|---|---|---|---|
| 5,918,223 A | 6/1999 | Blum et al. | |
| 6,230,197 B1* | 5/2001 | Beck et al. | 709/223 |
| 6,404,856 B1 | 6/2002 | Wilcox et al. | |
| 6,505,160 B1* | 1/2003 | Levy et al. | 704/270 |
| 6,507,643 B1 | 1/2003 | Groner | |
| 6,603,921 B1 | 8/2003 | Kanevsky et al. | |

(Continued)

FOREIGN PATENT DOCUMENTS

WO    WO 01/11496 A2    2/2001

(Continued)

OTHER PUBLICATIONS

International Search Report and Written Opinion for corresponding International Application No. PCT/US2008/005474 (13 pages); Mailing Date: Aug. 27, 2008.

(Continued)

*Primary Examiner* — Emmanuel L Moise
*Assistant Examiner* — Edward Kim
(74) *Attorney, Agent, or Firm* — Myers Bigel Sibley & Sajovec, P.A.

(57) ABSTRACT

A method of conducting a search using a mobile electronic device may include playing digital audio content at the mobile electronic device, and accepting user input at the mobile electronic device to capture a portion of the digital audio content. Search criteria may be provided wherein the search criteria is based on the captured portion of the digital audio content and on information separate from the captured portion of the digital audio content. A search may be conducted using the search criteria based on the captured portion of the digital audio content and on the information separate from the captured portion of the digital audio content. A result of the search may be provided at the mobile electronic device, and the result of the search may be displayed at the mobile electronic device.

14 Claims, 4 Drawing Sheets

U.S. PATENT DOCUMENTS

| | | | |
|---|---|---|---|
| 6,697,796 B2 | 2/2004 | Kermani | |
| 6,941,273 B1* | 9/2005 | Loghmani et al. | 705/26.62 |
| 7,039,585 B2* | 5/2006 | Wilmot et al. | 704/235 |
| 7,054,818 B2 | 5/2006 | Sharma et al. | |
| 7,092,496 B1 | 8/2006 | Maes et al. | |
| 7,283,973 B1* | 10/2007 | Loghmani et al. | 705/26.41 |
| 2002/0120456 A1* | 8/2002 | Berg et al. | 704/278 |
| 2002/0147592 A1* | 10/2002 | Wilmot et al. | 704/270.1 |
| 2003/0023421 A1 | 1/2003 | Finn et al. | |
| 2003/0125953 A1 | 7/2003 | Sharma | |
| 2003/0145062 A1 | 7/2003 | Sharma et al. | |
| 2003/0157968 A1* | 8/2003 | Boman et al. | 455/563 |
| 2004/0015504 A1* | 1/2004 | Ahad et al. | 707/100 |
| 2004/0199387 A1 | 10/2004 | Wang et al. | |
| 2004/0214555 A1 | 10/2004 | Kumar et al. | |
| 2005/0021826 A1 | 1/2005 | Kumar | |
| 2005/0216269 A1* | 9/2005 | Scahill et al. | 704/270.1 |
| 2006/0026206 A1* | 2/2006 | Loghmani et al. | 707/104.1 |
| 2006/0064499 A1 | 3/2006 | Sharma et al. | |
| 2006/0168095 A1 | 7/2006 | Sharma et al. | |
| 2006/0212897 A1 | 9/2006 | Li et al. | |
| 2007/0167187 A1 | 7/2007 | Rezvani et al. | |

FOREIGN PATENT DOCUMENTS

| | | |
|---|---|---|
| WO | WO 02/27707 A1 | 4/2002 |
| WO | WO 2006/025797 A1 | 3/2006 |
| WO | WO 2007/005120 A2 | 1/2007 |
| WO | WO 2007/005120 A3 | 1/2007 |
| WO | WO 2008/027074 A1 | 3/2008 |

OTHER PUBLICATIONS

Goddeau, D., Goldenthal, W., and Weikart, C. "*Deploying Speech Applications Over the Web*", http://www.research.digital.com/CRL/, Proceedings ESCA Eurospeech '97, ISSN 1018-4074, pp. 685-688, Rhodes Greece, 1997. XP-001003987.

International Preliminary Report on Patentability from corresponding International Application No. PCT/US2007/004032.

International Search Report from corresponding International Application No. PCT/US2007/004032.

Rui Cai et al. *Automated Music Video Generation Using Web Image Resource*, Microsoft Research Asia, Beijing 100080, P.R. China, http://research.microsoft.com/en-us/um/people/weilai/download/papers/MusicVideoGeneration_ICASSP07-lai.pdf 4 pages.

PCT Written Opinion of the International Preliminary Examining Authority PCT/US2008/005474.

* cited by examiner

METHODS OF SEARCHING USING CAPTURED PORTIONS OF DIGITAL AUDIO CONTENT AND ADDITIONAL INFORMATION SEPARATE THEREFROM AND RELATED SYSTEMS AND COMPUTER PROGRAM PRODUCTS

RELATED APPLICATION

This application claims the benefit of priority as a continuation-in-part of U.S. application Ser. No. 11/468,845 entitled "System And Method For Searching Based On Audio Search Criteria" filed Aug. 31, 2006, currently pending. This application also claims the benefit of priority from U.S. Application Ser. No. 60/980,470 entitled "Methods Of Searching Using Captured Portions Of Digital Audio Content And Additional Information Separate Therefrom And Related Systems And Computer Program Products" filed Oct. 17, 2007. The disclosures of both of the above referenced U.S. patent applications are hereby incorporated herein by reference in their entirety as if set forth fully herein.

FIELD OF THE INVENTION

The present invention relates generally to searching, and more particularly to searching based on audio content.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

Mobile telephones and other mobile devices may be used to conduct a search for content. For example, using a wireless application protocol (WAP) Internet browser or a full hypertext markup language (HTML) Internet browser, a user may key in alphanumeric characters to assemble a text-based query to be searched by a search engine. Traditionally, the user of a mobile device who is interested in conducting a search follows an approach that mimics the search strategy associated with personal computers. For instance, the user enters text into a search engine web site, such as the currently popular websites offered by Google and Yahoo.

Text based search strategies are often difficult to use with mobile devices due to the limited user interface of the mobile devices. Most mobile devices do not have a full alphanumeric keyboard or have alphanumeric keyboards with exceedingly small keys. One alternative to text based searching is a voice-based search. For example, Promptu of Menlo Park, Calif. and V-Enable of San Diego, Calif. offer search services where the user speaks into a microphone of the mobile device and the mobile telephone captures the spoken utterance (e.g., spoken phrase) as the desired search criteria. The captured audio data is transmitted to a remote server that converts the audio data to text using a recognition engine. Alternatively, the audio data may be converted to another domain or representation of the audio data (e.g., a value-based or grammatical representation). The server then carries out a search on the converted audio data against a database or other collection, and returns a list of search results to the mobile device.

The currently available speech-based search services require the user to speak in a manner that may be processed reliably by the recognition engine of the search service. This may be inconvenient to the user (e.g., in a library where the user cannot raise his or her voice) or infeasible in certain environments where noises may corrupt the captured audio data (e.g., in a public area such as a transportation center or in the user's vehicle).

SUMMARY

According to some embodiments of the present invention a method of conducting a search at a mobile electronic device may include playing digital audio content at the mobile electronic device, and accepting user input at the mobile electronic device to capture a portion of the digital audio content. Information separate from the captured portion of the digital audio content may be provided, and a result of a search may be provided at the mobile electronic device wherein the search is conducted using search criteria based on the captured portion of the digital audio and based on the information separate from the captured portion of the digital audio content. The result of the search may be displayed at the mobile electronic device.

Recognition may be performed on the captured portion of the digital audio content at the mobile electronic device to generate text or other non-audio information representing the captured portion of the digital audio content so that the search criteria includes the text or other non-audio information representing the captured portion of the digital audio content and the information separate from the captured portion of the digital audio content. The search criteria including the text and the information separate from the captured portion may be transmitted from the mobile electronic device to a remote processing device. In an alternative, the captured portion of the digital audio content and the information separate from the captured portion of the digital audio content may be transmitted from the mobile electronic device to a remote processing device.

The information separate from the captured portion of the digital audio content may include metadata associated with the digital audio content. In addition or in an alternative, the information separate from the captured portion of the digital audio content may include at least one of a location determined at the mobile electronic device, a time provided at the mobile electronic device, a date provided at the mobile electronic device, manually entered data accepted through a user interface at the mobile electronic device, data acquired at the mobile electronic device via a local-area wireless communications interface, and/or data received in a communication with another user and stored within, or accessible by, the mobile electronic device.

The search criteria may include text or other non-audio information representing the captured portion of the digital audio content. Moreover, the result of the search may include a network link. User selection of the network link may be accepted at the mobile electronic device, and responsive to accepting user selection of the network link, communication may be provided between the mobile electronic device and a remote network element represented by the network link.

According to some other embodiments of the present invention, a method of conducting a search using a mobile electronic device may include playing digital audio content at the mobile electronic device, and accepting user input at the mobile electronic device to capture a portion of the digital audio content. Search criteria may be provided wherein the search criteria is based on the captured portion of the digital audio content and on information separate from the captured portion of the digital audio content. A search may be conducted using the search criteria based on the captured portion of the digital audio content and on the information separate from the captured portion of the digital audio content. A result of the search may be provided at the mobile electronic device, and the result of the search may be displayed at the mobile electronic device.

The information separate from the captured portion of the digital audio content may include metadata associated with the digital audio content. In addition or in an alternative, the information separate from the captured portion of the digital audio content may include at least one of a location determined at the mobile electronic device, a time provided at the mobile electronic device, a date provided at the mobile electronic device, manually entered data accepted through a user interface at the mobile electronic device, data acquired at the mobile electronic device via a local-area wireless communications interface, and/or data received in a communication with another user and stored within, or accessible by, the mobile electronic device.

Providing the search criteria may include performing recognition processing on the captured portion of the digital audio content so that the search criteria includes text or other non-audio information representing the captured portion of the digital audio content. The result may include a network link, user selection of the network link may be accepted at the mobile electronic device, and responsive to accepting user selection of the network link, communication may be provided between the mobile electronic device and a remote network element defined by the network link.

Providing the search criteria may include providing the information separate from the captured portion of the digital audio content at the mobile electronic device and transmitting the information over a wireless interface and over a network to a remote processing device. Providing the result of the search may include transmitting the result of the search from a remote processing device over a network and over a wireless interface to the mobile electronic device.

According to still other embodiments of the present invention, a method of conducting a search for a mobile electronic device may include providing search criteria at a processing device remote from the mobile electronic device. More particularly, the search criteria may be based on a portion of digital audio content captured at the mobile device and on information separate from the captured portion of the digital audio content. A search may be conducted at the processing device using the search criteria based on the captured portion of the digital audio content and on the information separate from the captured portion of the digital audio content. A result of the search may be transmitted from the remote processing device to the mobile electronic device for display on a screen of the mobile electronic device.

Providing the search criteria may include receiving the captured portion of digital audio content at the remote processing device from the mobile electronic device, and performing recognition on the captured portion of the digital audio content to generate text or other non-audio information representing the captured portion of the digital audio content. Accordingly, the search criteria may include the text or other non-audio information representing the captured portion of the digital audio content and the information separate from the captured portion of the digital audio content. In an alternative, providing the search criteria may include receiving text or other non-audio information representing the captured portion of the digital audio content at the remote processing device from the mobile electronic device so that the search criteria includes the text or other non-audio information representing the captured portion of the digital audio content and the information separate from the captured portion of the digital audio content.

The information separate from the captured portion of the digital audio content may include metadata associated with the digital audio content. In addition or in an alternative, the information separate from the captured portion of the digital audio content may include at least one of a location determined at the mobile electronic device, a time provided at the mobile electronic device, a date provided at the mobile electronic device, manually entered data accepted through a user interface at the mobile electronic device, data acquired at the mobile electronic device via a local-area wireless communications interface, and/or data received in a communication with another user and stored within, or accessible by, the mobile electronic device.

The search criteria may include text or other non-audio information representing the captured portion of the digital audio content. Transmitting the result of the search may include transmitting the result of the search from the remote processing device over a network and over a wireless interface to the mobile electronic device.

DETAILED DESCRIPTION

Figure 1:
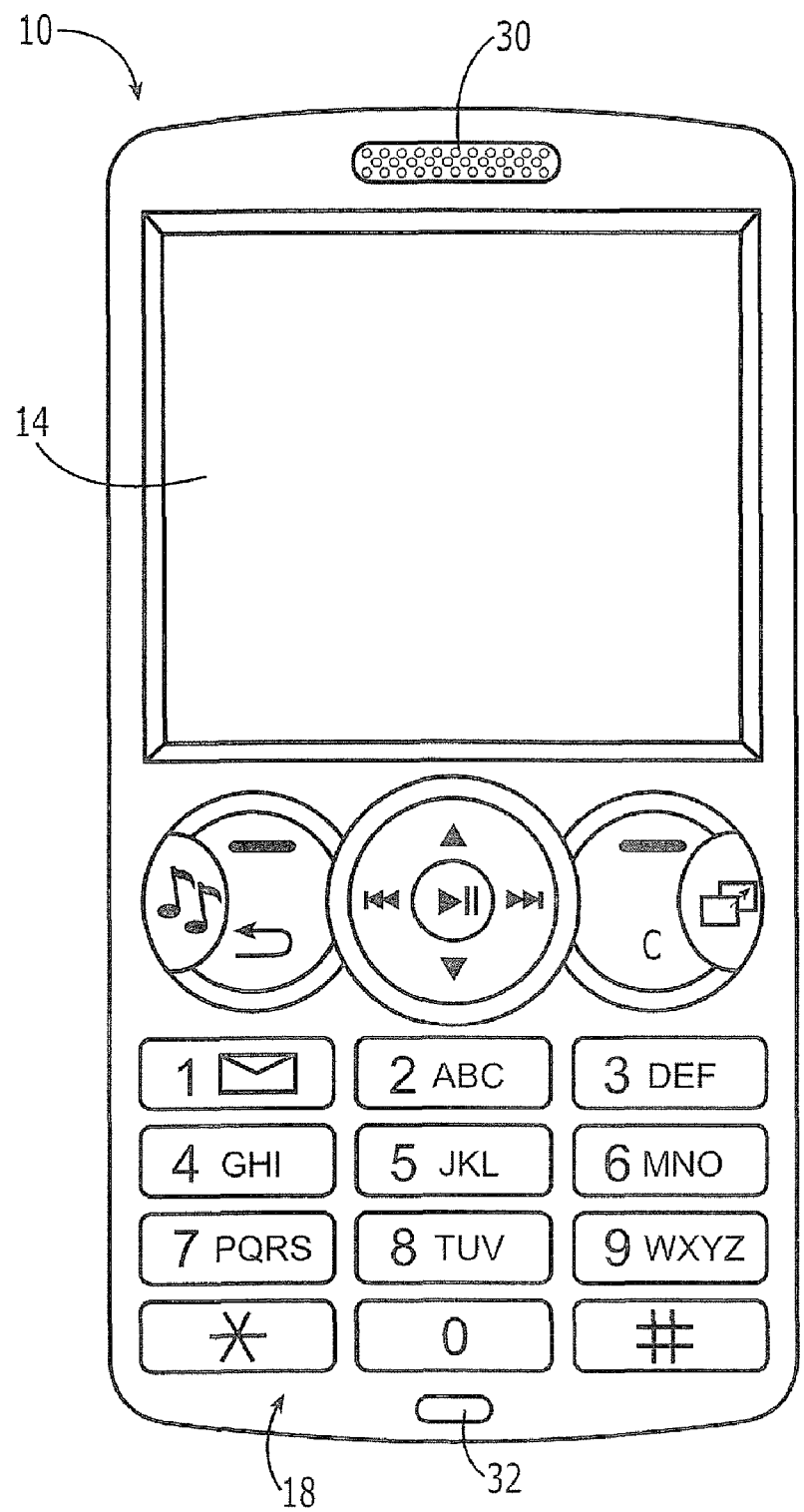
FIG. 1 is a schematic view of a mobile telephone as an example of a mobile electronic device in accordance with some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory) and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

As used herein, a "mobile electronic device" (or simply a "mobile device") includes, but is not limited to, a device that is configured to receive/transmit communication signals via a wireless interface with, for example, a cellular network, a wireless local area network (WLAN), a digital television network such as a DVB-H network, a satellite network, an AM/FM broadcast transmitter, and/or another communication terminal. Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (OPS) receiver; and a conventional laptop and/or palmtop receiver or other appliance that includes a radiotelephone transceiver.

Wireless communication between electronic devices may be accomplished using a wide variety of communication media, communication systems and communication standards. For example, mobile terminals such as wireless mobile telephones are typically configured to communicate via analog and/or digital wireless radio frequency (RF) telephone systems. Such devices may additionally be configured to communicate using wired and/or wireless local area networks (LANs), ad-hoc, short-range communication channels, such as Bluetooth RF communication channels and/or infrared communication channels, and/or long range communication systems, such as satellite communication systems.

The interchangeable terms "electronic equipment" and "electronic device" include portable radio communication equipment. The term "portable radio communication equipment," which herein after is referred to as a "mobile radio terminal" and/or "mobile electronic device," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment, examples of which include a media player, a gaming device and a computer.

Figure 2:
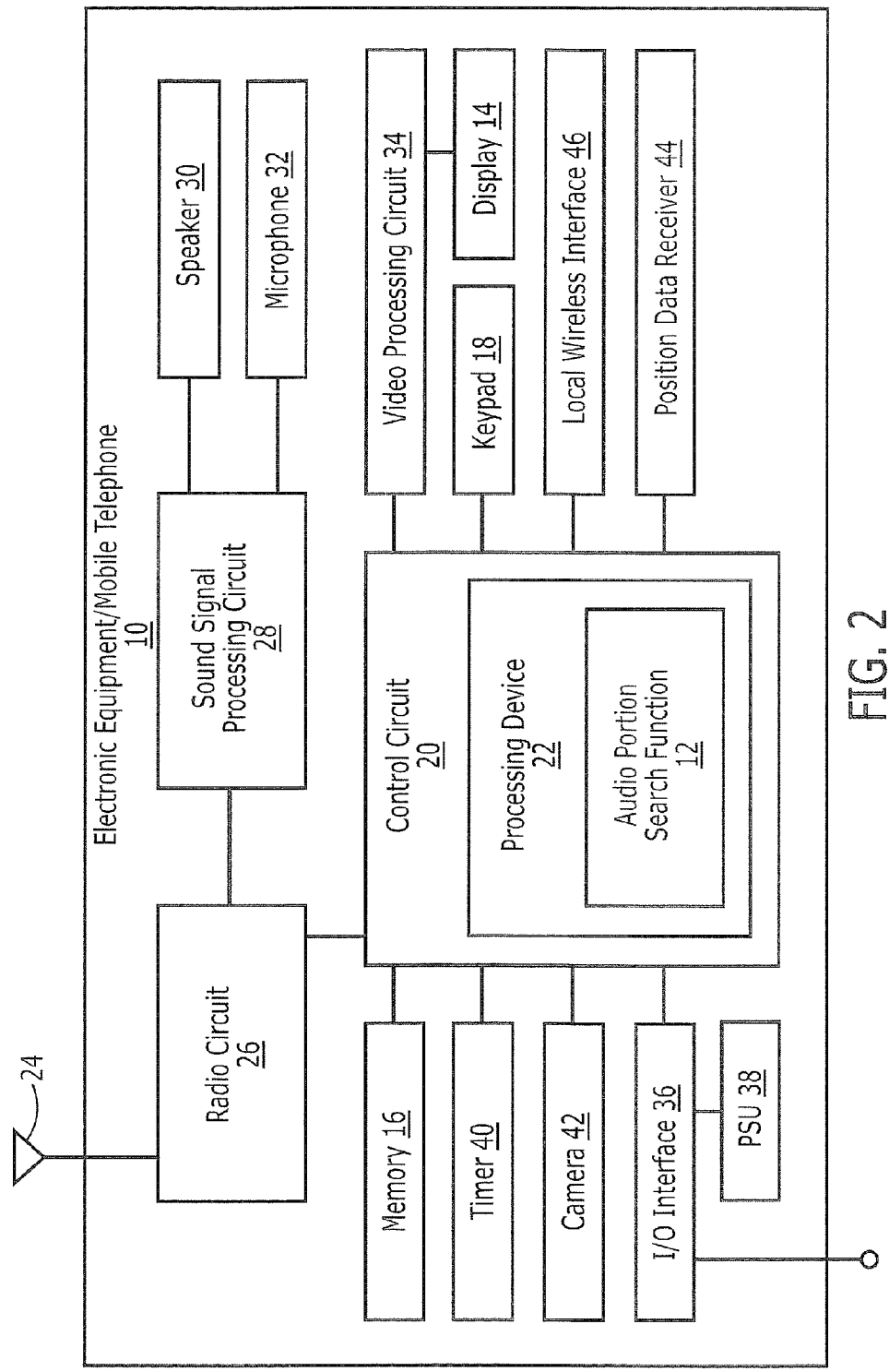
FIG. 2 is a schematic block diagram of relevant portions of the mobile telephone of FIG. 1 in accordance with some embodiments of the present invention.

Referring initially to FIGS. 1 and 2, an electronic device 10 is shown. The electronic device 10 includes an audio portion search function 12 that is configured to interact with audio content to generate an audio portion (e.g., a segment or clip of audio data) that includes search criteria. Additional details and operation of the audio portion search function 12 will be described in greater detail below. The audio portion search function 12 may be embodied as executable code that is resident in and executed by the electronic device 10. In one embodiment, the audio portion search function 12 may be a program stored on a computer or machine readable medium. The audio portion search function 12 may be a stand-alone software application or form a part of a software application that carries out additional tasks related to the electronic device 10.

The electronic device of the illustrated embodiment may be a mobile electronic device such as a mobile telephone and will be referred to as the mobile telephone 10. The mobile telephone 10 is shown as having a "brick" or "block" form factor housing, but it will be appreciated that other type housings, such as a clamshell housing or a slide-type housing, may be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys configured to allow entry of alphanumeric information such as telephone numbers, phone lists, contact information, notes, etc. In addition, the keypad 18 may include special function keys such as a "call send" key configured to initiate or answer a call, and a "call end" key configured to end or "hang up" a call. Special function keys may also include menu navigation and select keys, for example, configured to navigate through a menu displayed on the display 14 to select different telephone functions, profiles, settings, etc., as is conventional. Special function keys may include audiovisual content playback keys to start, stop and pause playback, skip or repeat tracks, etc. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi, WiMax, etc. Another example includes a video enabled call that is established over a cellular or alternative network.

The mobile telephone 10 may be configured to transmit, receive and/or process data, such as text messages (e.g., sometimes referred to as an "SMS" message), electronic mail messages, multimedia messages (e.g., sometimes referred to as an "MMS" message), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as memory 16, in order to carry out operation of the mobile telephone 10. The memory 16 may be, for example, one or more of a buffer, a flash memory, a hard drive, a removable media, a volatile memory, a non-volatile memory or other suitable device.

In addition, the processing device 22 may execute code that implements the audio portion search function 12. It will be apparent to a person having ordinary skill in the art of computer programming, and specifically in application programming for mobile telephones or other electronic devices, how to program a mobile telephone 10 to operate and carry out logical functions associated with the audio portion search function 12. Accordingly, details as to specific programming code have been left out for the sake of brevity. Also, while the audio portion search function 12 is executed by the processing device 22 in accordance with some embodiments of the invention, such functionality could also be carried out via dedicated hardware, firmware, software, or combinations thereof without departing from the scope of the invention.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data, audio, and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, etc as well as advanced versions of these standards.

The mobile telephone 10 further includes a sound signal processing circuit 28 configured to process audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 22, or received audio data such as in the form of streaming audio data from a mobile radio service. The sound processing circuit 28 may include any appropriate buffers, decoders, amplifiers, etc.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream received by the radio circuit 28 or obtained by any other suitable method.

The mobile telephone 10 further includes one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 may also include a timer 40 configured to carry out timing functions. Such functions may include timing the durations of calls, generating the content of time and date stamps, etc. The mobile telephone 10 may include a camera 42 configured to take digital pictures and/or movies. Image and/or video files corresponding to the pictures and/or movies may be stored in the memory 16. The mobile telephone 10 also may include a position data receiver 44, such as a global positioning system (GPS) receiver, Galileo satellite system receiver or the like.

The mobile telephone 10 also may include a local wireless interface 46, such as an infrared transceiver and/or an RF adaptor (e.g., a Bluetooth adapter), configured to establish communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
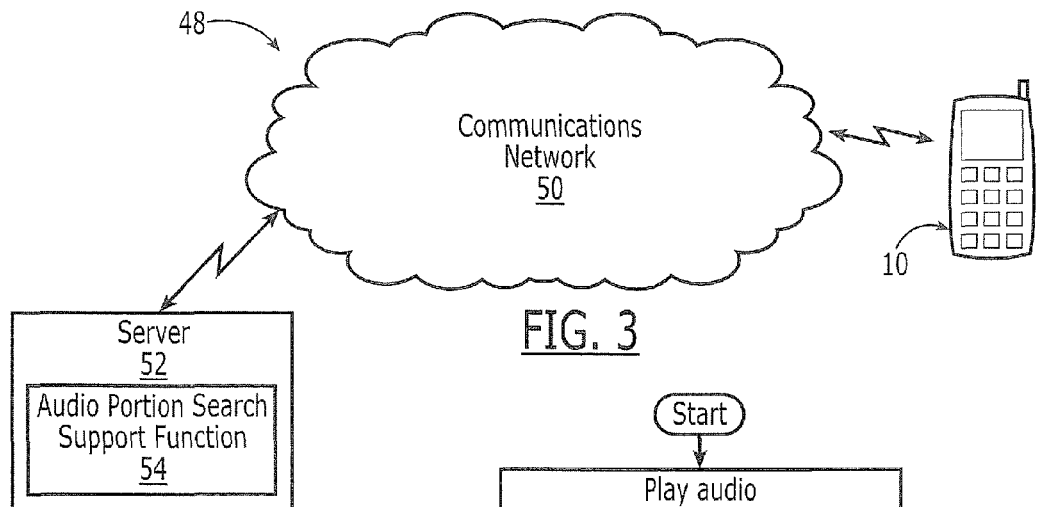
FIG. 3 is a schematic diagram of a communications system in which the mobile telephone of FIG. 1 may operate.

With additional reference to FIG. 3, the mobile telephone 10 may be configured to communicate over a communications system 48. The system 48 may include a communications network 50 providing communications between the mobile telephone 10 and a remote processing device such as a server 52 (or servers). The communications network may also be configured to manage calls placed by and destined to the mobile telephone 10, to transmit data to the mobile telephone 10, and/or to carry out any other support functions. The server 52 may communicate with the mobile telephone 10 via a transmission medium, such as the communications network 50. The transmission medium may be any appropriate device or assembly, including, for example, a communications tower (e.g., a cell tower), another mobile telephone, a wireless access point, a satellite, the Internet, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software including logical instructions that embody the functions of the server 52. In one embodiment, the server stores and executes logical instructions that embody an audio portion search support function 54. The audio portion search support function 54 may be configured to process audio portions generated by the audio portion search function 12 and return corresponding search results to the mobile telephone 10.

Additional details and operation of the audio portion search support function 54 will be described in greater detail below. The audio portion search support function 54 may be embodied as executable code that is resident in and executed by the server 52. In one embodiment, the audio portion search support function 54 may be a program stored on a computer or machine readable medium. The audio portion search support function 54 may be a stand-alone software application or form a part of a software application that carries out additional tasks related to operation of the server 54.

Figure 4:
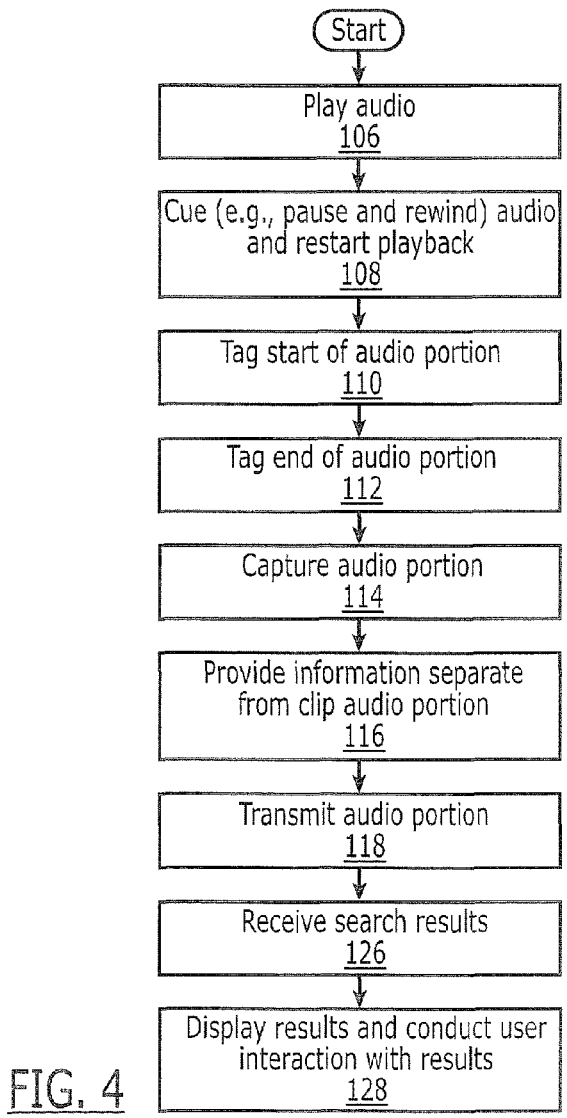
FIG. 4 is a flow chart representing operations of conducting a search based on audio search criteria with the mobile telephone of FIG. 1 in accordance with some embodiments of the present invention.

With additional reference to FIG. 4, illustrated are logical operations performed by a mobile electronic device such as the mobile telephone 10 when executing the audio portion search function 12. The flow chart of FIG. 4 may be thought of as depicting steps of a method carried out by the mobile telephone 10. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting and the like. It is understood that all such variations are within the scope of the present invention.

The logical flow for the audio portion search function 12 may begin at block 106 of FIG. 4 where digital audio content is played for a user of the mobile telephone 10. The audio content may be derived from any suitable source, such as a stored file, a podcast, a Really Simple Syndication (RSS) feed, a streaming service (e.g., mobile radio), etc. The audio content may be stored by the mobile telephone 10 or received by the mobile telephone 10 for immediate playback. Moreover, the user may have an ability to control a flow of the digital audio content (e.g., an ability to stop, pause, rewind, and/or resume playback). The digital audio content may be received from a non-broadcast source, and/or digital audio data may be buffered, stored, and/or converted for use with the audio portion search function 12.

The audio content may be derived from a source having only an audio component or from a source having multimedia content, such as an audiovisual source having audio and video components. During playback, the audio content may be converted to audible sounds that are output (i.e., played) to the user using speaker 30 and/or by a speaker of a headset that is operatively interfaced with the mobile telephone 10.

As the audio content is played back, the user may hear a phrase (e.g., a word or group of words) for which the user may desire more information. Phrases of interest to the user may appear in a news report, in a song, in an announcement by an announcer (e.g., a disk jockey (DJ)), in a commercial advertisement, a recorded lecture, etc. For instance, the played audio content may include a place, a person's name, a corporate entity, a song title, an artist, a book, a historical event, a medical term, or other item. The user may be interested in finding out more information about the item associated with the played phrase.

As indicated, the audio portion search function 12 may be used to generate an audio portion that includes search criteria for an Internet or database search. The logical functions described below set forth an example of generating such an audio portion from the audio content that is played back in block 106 according to some embodiments of the present invention.

Turning to block 108, when the user hears a phrase of interest that may serve as the basis for a search, the user may cue the audio playback to a point in the audio content prior to the phrase of interest. Cuing the audio content may involve, for example, pausing the audio playback and rewinding the playback. In one embodiment, a user input (e.g., a depression of a key from the keypad 18 or menu option selection) may be used to skip backward a predetermined amount of audio content in terms of time, such as about one second to about ten seconds worth of audio content. In the case of audio content that is streamed to the mobile telephone 10, the playback of the audio content may be controlled using a protocol such as Real Time Streaming Protocol (RTSP) to allow the user to pause, rewind and resume playback of the streamed audio content.

The playback may be resumed so that the phrase may be replayed to the user. During the replaying of the phrase, the phrase may be tagged in blocks 110 and 112 to identify the portion of the audio content for use as the audio portion. For instance, user input in the form of a depression of a key from the keypad 18 may serve as a command input to tag the beginning of the portion and a second depression of the key may serve as a command input to tag the end of the portion. In another embodiment, the depression of a button may serve as a command input to tag the beginning of the portion and the release of the button may serve as a command input to tag the end of the portion so that the portion corresponds to the audio content played while the button was depressed. In another embodiment, user voice commands or any other appropriate user input action may be used to command tagging the start and the end of the desired audio portion.

In one embodiment, the tag for the start of the portion may be offset from the time of the corresponding user input to accommodate a lag between playback and user action. For example, the start tag may be positioned relative to the audio content by about a half second to about one second before the point in the content when the user input to tag the beginning of the portion is received. Similarly, the tag for the end of the portion may be offset from the time of the corresponding user input to assist in positioning the entire phrase between the start tag and the end tag, thereby accommodating premature user action. For example, the end tag may be positioned relative to the audio content by about a half second to about one second after the point in the content when the user input to tag the end of the portion is received.

Once the start and the end of the portion have been tagged, the portion may be captured in block 114. For instance, the portion of the audio content between the start tag and the end tag may be extracted, excerpted, sampled or copied to generate the audio portion. In some embodiments, the audio portion may be stored in the form of an audio file.

The captured audio portion may be played back to the user so that the user may confirm that the captured content corresponds to audible sounds pertaining to the phrase for which the user wants more information or wants to retrieve related files. If the audio portion does not include the desired phrase, the user may command the audio portion search function 12 to repeat steps 108 through 114 to generate a new audio portion including the desired phrase.

In some embodiments, the user may be given the opportunity to edit the audio portion. For example, the user may be provided with options to tag a portion of the audio portion and remove the tagged portion, which may improve search results when extraneous words are present between search terms of greater interest. In another example, the user may be provided with options to merge two or more audio portions. In another example, the user may be provided with options to append an audio portion with a word or words spoken by the user.

Also, the audio portion search function 12 may be configured to process the audio portion. For instance, the audio portion may be processed in preparation for recognition processing and/or for searching. The processing may include filtering, audio processing (e.g., digital signal processing) or extraction, conducting initial or fall recognition functions, etc. Thus, the captured audio portion may include raw audio data, partially processed audio data or fully processed audio data.

User input may thus be accepted at the mobile electronic device to capture a portion (or select a segment) of the digital audio content as discussed above with respect to blocks 106-114. In addition, information separate from the captured portion of the digital audio content may be provided at block 116. The information separate from the captured portion of the digital audio content may include metadata associated with the digital audio content, and the metadata may include a source of digital audio content, a title of digital audio content, a creator (e.g., author or artist associated with digital audio content, etc.). In addition or in an alternative(s) the information separate from the captured portion of the digital audio content may include at least one of a location determined at the mobile electronic device (e.g., using global positioning system (GPS) satellites), a time provided at the mobile electronic device (e.g., from a clock of the mobile electronic device), a date provided at the mobile electronic device (e.g., from a clock/calendar of the mobile electronic device), manually entered data accepted through a user interface at the mobile electronic device, data acquired at the mobile electronic device via a local-area wireless communications interface (e.g. wireless LAN, infrared, near-field communications (NFC), Bluetooth, Zigbee, etc.), and/or data received in a communication with another user and stored within, or accessible by, the mobile electronic device.

The captured portion of the digital audio content and the information separate from the captured portion may be transmitted to the server 52 at block 118. Transmission of the captured audio portion and the separate information may be accomplished using any suitable method, such as packaging the audio portion as part of an MMS, using a file transfer technique, as part of a call, or as part of an interactive communication session based on familiar protocols such as Internet Protocol (IP), Transmission Control Protocol (TCP), User Datagram Protocol (UDP), Real Time Protocol (RTP), etc. The captured portion and the separate information may thus be transmitted from a mobile electronic device over a wireless interface (e.g., a wireless cellular radiotelephone interface, a satellite radiotelephone interface, a wireless WIFI interface, etc.) and over a network (e.g., the Internet, a local area network, a wide area network, etc.) to the server 52.

According to some embodiments of the present invention, the audio tagging function (e.g., blocks 110 and 112) may be configured to begin automatically when the audio content is rewound. The tagged audio may start at the point in the audio content reached by the rewinding action. In addition, some embodiments may operate in a manner in which tagging the end of the audio portion (block 112) initiates any processing of the audio portion carried out by the mobile telephone 10 and initiates transmission of the audio portion to the server 52 and the information separate from the captured portion. Alternatively, tagging the end of the audio portion may generate a message (e.g., graphical user interface) that prompts the user to choose an option, such as sending, editing or listening to the captured audio portion.

In addition, the user may be prompted to select the information separate from the captured portion of digital audio content. For example, a prompt may be generated at the electronic component 10 asking the user whether he/she wishes to provide any information separate from the captured portion of digital audio content. If the user provides an affirmative response as an input to the electronic device 10, a menu of possible types of information may be generated at the electronic device 10. As discussed above, the separate information may include metadata, a location, a time, a date, manually entered data, data acquired at the mobile electronic device via a local-area-wireless communications interface, and/or data received in a communication with a user of another communications device. If the user selects one type, and then chooses a particular example of that type to add, he/she could then be prompted at to whether more examples of the current type, or another type, are to be added.

Figure 5:
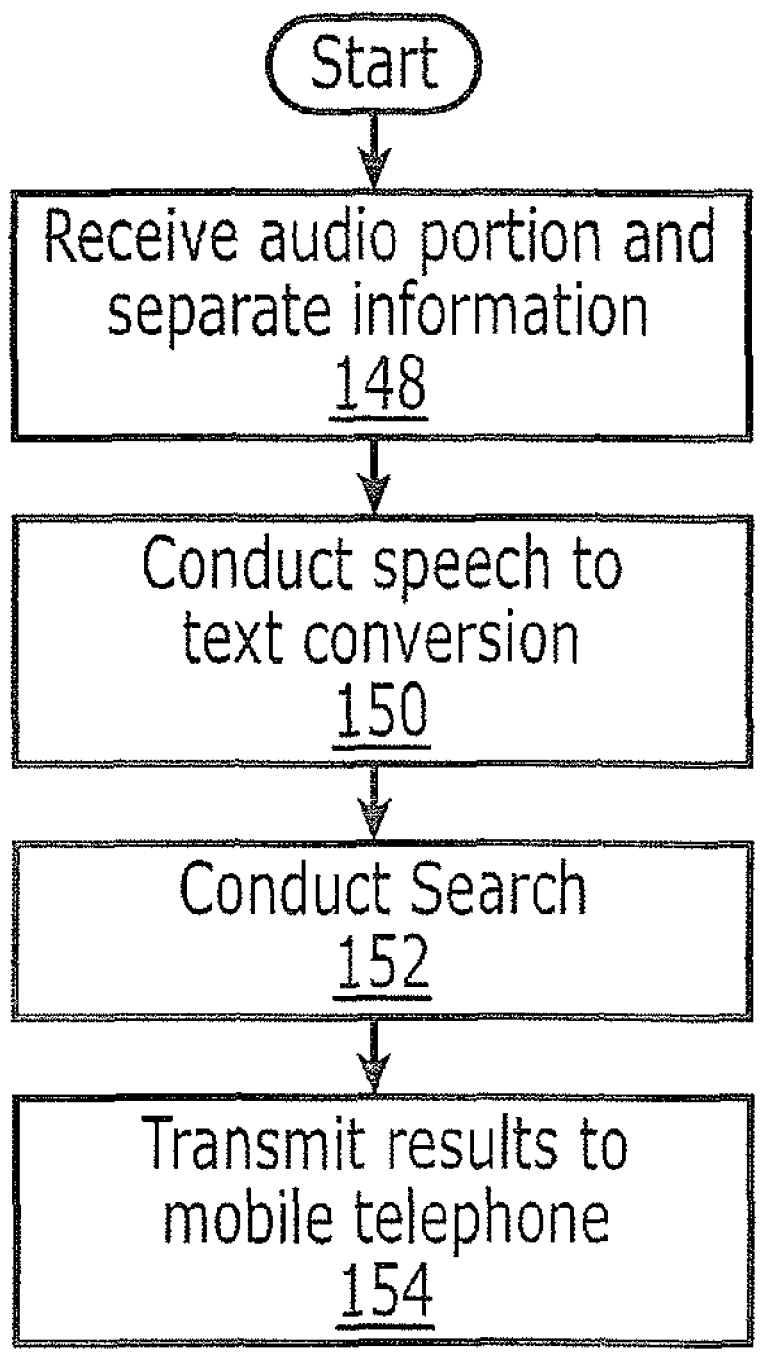
FIG. 5 is a flow chart representing operations of conducting a search based on audio search criteria with a server that receives the audio search criteria from the mobile telephone of FIG. 1 in accordance with some embodiments of the present invention.

With additional reference to FIG. 5, illustrated are logical operations performed by the server 52 when executing the audio portion search support function 54. The flow chart of FIG. 5 may be thought of as depicting steps of a method carried out by the server 52. Although FIG. 5 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow for the audio portion search support function 54 may begin in block 148 where the server 52 receives the audio portion and the separate information that was transmitted by the mobile telephone 10 at block 118. As indicated, the transmitted audio portion may include raw audio data, partially processed audio data or fully processed audio data. Thus, some or all of the steps to process the tagged audio portion into a form useful to a search function of the audio portion search support function 54 may be carried out by the mobile telephone 10.

Next, in block 150 and if not already accomplished by the mobile telephone 10, the captured audio portion may be converted using a recognition engine into search criteria that may be acted upon by a search engine. For instance, the recognition engine may convert the audio portion to text using a speech-to-text conversion process. Alternatively, the recognition engine may attempt to extract patterns or features from the audio portion that are meaningful in terms of a "vocabulary" set. In this embodiment, the converted audio data has characteristics that may be matched to a collection of searchable information. For instance, the audio data may be converted to another domain or representation of the audio data. While recognition software is undergoing continuous improvement, suitable conversion engines will be known to those of ordinary skill in the art. The recognition engine may form a part of the audio portion search support function 54 or may be a separate software application that interacts with the audio portion search support function 54.

According to some embodiments of the present invention, the captured portion of the digital audio content and the information separate from the captured portion of the digital audio content may be transmitted from the mobile electronic device to the server, and the server may then perform recognition on the captured portion to provide text or other non-audio information representing the captured portion. According to other embodiments of the present invention, recognition may be performed on the captured portion at the mobile telephone to generate text or other non-audio information representing the captured portion at the mobile telephone so that the text or other non-audio information representing the captured portion and the separate information may be transmitted from the mobile telephone to the server. Either way, search criteria may be based on the captured portion of the digital audio content and on the information separate from the captured portion of the digital audio content.

Once the captured audio portion has been converted to search criteria, the audio portion search support function 54 may use the converted audio portion and the separate information to conduct a search at block 152 using a search engine. In the case where text is extracted from the audio portion by the recognition engine, the search engine may use a word or words that form part of the text. The text may be parsed to identify key words for use as search criteria or each word from the converted text may be used in the search string. The search engine may form part of the audio portion search support function 54 or may be a separate software application that interacts with the audio portion search support function 54. The recognition engine and/or the search engine may be executed by a server that is different than the server 52 that executes the audio portion search support function 54.

In some embodiments, the search engine may be configured to search the Internet using the search criteria that is derived from the audio portion and from the separate information to identify Internet pages and/or websites that may be of interest to the user. For example, the search engine may be implemented in a server that is also used to conduct Internet searches based on text entries made by a user, or the search engine may be implemented in another functional element included in the network 50 domain or in an Internet Service Provider (ISP). In other embodiments, the search engine may search a particular database for content and/or files relating to the search criteria. The search may be a general search of the potential sources of content (e.g., the Internet or database) or a search for particular types of content. Thus, the search may be carried out at block 152 by the server 52, another server that is part of the network 50, and/or a server that is outside the domain of the network 50. In other embodiments, the search may be carried out by the mobile telephone 10, in which case the search support function may be resident in the mobile telephone 10.

The search engine may be configured to return a result or results of the search as a full or partial list of matches to the search criteria, and/or to prioritize the matches based on predicted relevancy or other prioritization technique (e.g., the match ordering schemes employed by Yahoo, Google or other common search engine). The types of matches that are returned by the search may depend on the nature of the search criteria. The nature of the search criteria may be determined using a database to match the search criteria to a category or categories (e.g., a song, a person, a place, a book, an artist, etc.) or may be based on the type of content matches that the search generates (e.g., consistent types of matches may reveal a category or categories to which the search criteria belongs). As an example, if the search criteria relates to a song, the returned matches may be links for music sites from which the song is available, associated downloads (e.g., a ringtone, artist wallpaper, etc.), fan websites for the song's artist and so forth. As another example, if the search criteria relates to a book, the returned matches may be links for book vendors from which the book may be purchased, reviews of the book, blogs about the book, etc. As another example, if the search criteria relates to a location, the returned matches may be links to sites with travel blogs, travel booking services, news reports for the location and so forth.

As discussed above, the search may be performed using search criteria based on the captured portion of digital audio content and based on information separate from the captured portion. If the separate information includes metadata associated with the digital audio content, the search engine may scour the Internet or target database in the manner used by common Internet and database search engines. By providing information separate from the captured portion a scope of the search may be narrowed so that search results are more relevant to the user's interest. Stated in other words, the information separate from the captured portion of audio content may provide context for a search based on terms extracted from the captured portion. For example, the digital audio content may be a song, and the separate information may be metadata identifying the song title, a time elapsed in the song, an album title, a performer(s), a song writer, etc.; the digital audio content may be a news program, and the separate information may be metadata identifying a program title, a story title, an announcer, a subject, a time elapsed in the program, a writer, etc.; and/or the digital audio content may be an audio book, and the separate information may be metadata identifying a book title, a chapter, a time elapsed in the book, an author, an illustrator, a subject, etc. In an embodiment where the captured portion of digital audio content is processed such that the resulting search criteria are extracted patterns or features (e.g., values or phonemes corresponding to a machine useable vocabulary), the search engine may attempt to match the search criteria to reference sources (e.g., Internet pages or database content) that have had corresponding descriptive metadata or content converted into a format that is matchable to the search criteria.

Moreover, the search may be performed in a single pass or in multiple passes. For example, the search may be performed in one pass using the search criteria based on the captured portion of digital audio content and using the search criteria based on the separate information at the same time. In an alternative, one or more passes may be performed using the search criteria based on the captured portion and one or more passes may be performed using the search criteria based on the separate information.

Once the search result or results are acquired by the search engine, the returned search result or results may be transmitted to the mobile telephone 10 at block 154. The result or results may be transmitted in a suitable form, such as links to websites, links to files and so forth. The results may be transmitted using any appropriate protocol, such as WAP. For example, the result or results may be transmitted from the server 52 to the mobile telephone 10 over a network (e.g., the Internet, a local area network, a wide area network, etc.) and over a wireless interface (e.g., a wireless cellular radiotelephone interface, a satellite radiotelephone interface, a wireless WIFI interface, etc.).

Returning to the flow chart of FIG. 4, the result(s) may be received by the mobile telephone in block 126. Thereafter, at block 128, the result(s) may be displayed on a screen of the mobile telephone 10 to the user, and the user may interact with the search result(s), such as by selecting a displayed link to retrieve a webpage or a file. For example, the result(s) may include a network link, user selection of the network link may be accepted through a user interface (e.g., a keypad, a touch sensitive screen, a dial, a joystick, etc.) at the mobile electronic device, and responsive to accepting user selection of the network link, communication may be provided between the mobile electronic device and a remote network element (e.g., to access a webpage) defined by the network link.

In one embodiment, the audio portion may be formatted for use by a Voice eXtensible Markup Language (VoiceXML) application. For example, the audio portion search support function 54 may be or may include VoiceXML processing functionality. VoiceXML is a markup language developed specifically for voice applications over a network, such as the Internet. VoiceXML Forum is an industry working group that, through VoiceXML Specification 2.1, describes VoiceXML as an audio interface through which users may interact with Internet content, similar to the manner in which the Hypertext Markup Language (HTML) specifies the visual presentation of such content. In this regard, VoiceXML includes intrinsic constructs for tasks such as dialogue flow, grammar, call transfers, and embedding audio files.

In one embodiment, certain portions of audiovisual content played in block 106 may be associated with metadata, such as a text identification of a spoken phrase. The metadata may be displayed and directly selected by the user as search criteria for a search. Alternatively, the metadata may be indirectly selected by the user by tagging the audio content in the manner of blocks 108 through 112. In this embodiment, the metadata may be transmitted to the server 52 as search criteria instead of or in addition to an audio portion and the ensuing search may be carried out using the metadata as a search string.

The above-described methods of searching based on capturing an audio portion may be applied to a search based on a captured video portion. For instance, the user may tag a segment of video or an image, and an associated video portion may be transmitted to the server 52 for processing. Image recognition software may be used to extract a search term from the video portion upon which a search may be carried out.

In another embodiment, the above-described methods of search may be applied to a searched based on captured text. For example, the user may tag a segment of text from a file, an SMS, an electronic mail message or the like, and an associated text portion may be transmitted to the server 52 for processing. The text portion may directly serve as the search terms upon which a search may be carried out.

The techniques described herein for conducting a search provide the user with the ability to mark a segment of existing audio content, visual content or text, and submit the segment to a search engine that carries out a search on the marked segment of content. As will be appreciated, the marked content may be derived from content that has been stored on the user's device (e.g., by downloading or file transfer) or from actively consumed content (e.g., content that is streamed from a remote location). In this manner, the user may conveniently associate a search for desired content to existing content by establishing search criteria for the search from the existing content. Also, generation of the search criteria need not rely on voice input or alphanumeric text input from the user.

By way of example, digital audio content (such as a news program) may be streamed over a network (such as the Internet) and a wireless interface and played at a mobile electronic device 10 as discussed above with respect to block 106 of FIG. 4. The digital audio content may be parsed and associated metadata (e.g., time, date, program title, location, etc.) may be extracted. The content may be rendered (e.g., played) to provide an audible output that the user can listen to. If the user hears a word, please, or segment that he/she would like to use as the basis of a search, a portion of the digital audio content (including the word, phrase, or segment of interest) may be captured as discussed above with respect to blocks 108-114 of FIG. 4. Audio parameters (e.g., text, digital representation of audio, etc.) of the captured portion may be obtained, and the audio parameters and related metadata (and/ or other information separate from the captured portion) may be transmitted to the server 52 providing the search function. A search based on the captured portion and the metadata (and/or other information separate from the captured portion) may be performed, and the result(s) may be transmitted to the mobile electronic device 10.

The search result(s) may be provided on a display of the mobile electronic device 10, and a user may select a search result to initiate a communication with a remote network element identified by the selected result, for example, to access a webpage and/or file. By searching based on the metadata and/or other information separate from the captured portion in addition to searching based on captured portion, the search may be more focused within an appropriate context based on the metadata and/or other information. For example, the metadata or other information may identify the audio content as a song, and the search may be focused within the context of music related sites, for example, where the song, ringtones, and/or where other music related content (e.g., artist "wallpaper") may be accessed/downloaded. The metadata or other information may identify the audio content as a book, and the search may be focused within the context of book related sites, for example, where books, book reviews, and/or blogs regarding books may be accessed and/or downloaded. The metadata or other information may identify the audio content as a destination/location, and the search may be focused within the context of travel related sites, for example, where travel related materials such as books, blogs, and/or services (e.g., travel agent services) may be accessed and/or downloaded.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of conducting a search using a mobile electronic device, the method comprising:
    playing digital audio content at the mobile electronic device;
    accepting user input at the mobile electronic device to capture a portion of the digital audio content played at the mobile electronic device;
    providing search criteria wherein the search criteria is based on the captured portion of the digital audio content and on metadata extracted from the digital audio content wherein providing the search criteria comprises performing recognition on the captured portion of the digital audio content at the mobile electronic device to generate text representing the captured portion of the digital audio content so that the search criteria includes the text and the metadata extracted from the digital audio content;
    transmitting the search criteria including the text and the metadata extracted from the digital audio content to a remote processing device to initiate an Internet search using the search criteria based on the text representing the captured portion of the digital audio content and on the metadata extracted from the digital audio content so that the search is conducted at the remote processing device;
    providing a result of the search at the mobile electronic device; and
    displaying the result of the search at the mobile electronic device.

2. A method according to claim 1 wherein providing search criteria further comprises providing at least one of a location determined at the mobile electronic device, a time provided at the mobile electronic device, a date provided at the mobile electronic device, manually entered data accepted through a user interface at the mobile electronic device, data acquired at the mobile electronic device via a local-area wireless communications interface, and/or data received in a communication with another user and stored within, or accessible by, the mobile electronic device.

3. A method according to claim 1 wherein the text representing the captured portion of the digital audio content is separate from the metadata.

4. A method according to claim 1 wherein the result comprises a network link, the method further comprising:
    accepting user selection of the network link at the mobile electronic device; and
    responsive to accepting user selection of the network link, providing communication between the mobile electronic device and a remote network element defined by the network link.

5. A method according to claim 1 wherein providing the search criteria comprises providing the search criteria at the mobile electronic device and wherein transmitting the search criteria comprises transmitting the search criteria over a wireless interface and over a network to a remote processing device.

6. A method according to claim 1 wherein providing the result of the Internet search comprises receiving the result of the search from a remote processing device over a network and over a wireless interface to at the mobile electronic device.

7. A method of conducting a search for a mobile electronic device, the method comprising:
    providing search criteria at a processing device remote from the mobile electronic device wherein the search criteria is based on a portion of digital audio content captured at the mobile electronic device and based on metadata extracted from the digital audio content wherein providing the search criteria includes receiving text representing the captured portion of the digital audio content at the remote processing device from the mobile electronic device so that the search criteria includes the text representing the captured portion of the digital audio content and the metadata extracted from the digital audio content;
    initiating an Internet search at the processing device using the search criteria based on the text representing the captured portion of the digital audio content and on the metadata extracted from the digital audio content; and
    transmitting a result of the search from the remote processing device to the mobile electronic device for display on a screen of the mobile electronic device.

8. A method of conducting a search for a mobile electronic device, the method comprising:
    providing search criteria at a processing device remote from the mobile electronic device wherein the search criteria is based on a portion of digital audio content captured at the mobile electronic device and based on metadata extracted from the digital audio content, wherein providing the search criteria includes,
        receiving the captured portion of digital audio content at the remote processing device from the mobile electronic device, and
        performing recognition on the captured portion of the digital audio content to generate text representing the captured portion of the digital audio content so that the search criteria includes the text representing the captured portion of the digital audio content and the metadata extracted from the digital audio content;

initiating an Internet search at the processing device using the search criteria including the text representing the captured portion of the digital audio content and using the metadata extracted from the digital audio content; and transmitting a result of the search from the remote processing device to the mobile electronic device for display on a screen of the mobile electronic device.

9. A method according to claim 7 wherein providing search criteria further comprises providing at least one of a location determined at the mobile electronic device, a time provided at the mobile electronic device, a date provided at the mobile electronic device, manually entered data accepted through a user interface at the mobile electronic device, data acquired at the mobile electronic device via a local-area wireless communications interface, and/or data received in a communication with another user and stored within, or accessible by, the mobile electronic device.

10. A method according to claim 7 wherein transmitting the result of the search comprises transmitting the result of the search from the remote processing device over a network and over a wireless interface to the mobile electronic device.

11. A method according to claim 1 wherein initiating the Internet search comprises initiating an Internet search to identify Internet pages and/or websites.

12. A method according to claim 7 wherein initiating the Internet search comprises initiating an Internet search to identify Internet pages and/or websites.

13. A method according to claim 1 wherein the metadata extracted from the digital audio content comprises at least one of a source of the digital audio content, a title of the digital audio content, a creator of the digital audio content, a performer of the digital audio content, and/or an elapsed time of the captured portion of the digital audio content.

14. A method according to claim 7 wherein the metadata extracted from the digital audio content comprises at least one of a source of the digital audio content, a title of the digital audio content, a creator of the digital audio content, a performer of the digital audio content, and/or an elapsed time of the captured portion of the digital audio content.

* * * * *

UNITED STATES PATENT AND TRADEMARK OFFICE
CERTIFICATE OF CORRECTION

PATENT NO. : 8,239,480 B2  Page 1 of 1
APPLICATION NO. : 11/931072
DATED : August 7, 2012
INVENTOR(S) : Kokes et al.

It is certified that error appears in the above-identified patent and that said Letters Patent is hereby corrected as shown below:

In the Claims:
Column 18, Claim 6, Line 30: Please correct "interface to at the mobile"
to read -- interface at the mobile --

Signed and Sealed this
Eighteenth Day of December, 2012

David J. Kappos
*Director of the United States Patent and Trademark Office*